(12) United States Patent
Huang et al.

(10) Patent No.: US 12,549,422 B2
(45) Date of Patent: Feb. 10, 2026

(54) COMMUNICATION APPARATUS AND COMMUNICATION METHOD FOR PPDU FORMAT IDENTIFICATION

(71) Applicant: Panasonic Intellectual Property Corporation of America, Torrance, CA (US)

(72) Inventors: Lei Huang, Singapore (SG); Yoshio Urabe, Nara (JP); Yanyi Ding, Singapore (SG); Rojan Chitrakar, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 425 days.

(21) Appl. No.: 17/438,331

(22) PCT Filed: Mar. 6, 2020

(86) PCT No.: PCT/SG2020/050107
§ 371 (c)(1),
(2) Date: Sep. 10, 2021

(87) PCT Pub. No.: WO2020/197488
PCT Pub. Date: Oct. 1, 2020

(65) Prior Publication Data
US 2022/0182273 A1 Jun. 9, 2022

(30) Foreign Application Priority Data
Mar. 27, 2019 (SG) .............................. 10201902764S

(51) Int. Cl.
*H04L 27/26* (2006.01)
*H04W 84/12* (2009.01)

(52) U.S. Cl.
CPC ......... *H04L 27/2613* (2013.01); *H04W 84/12* (2013.01)

(58) Field of Classification Search
CPC ............... H04L 27/2613; H04L 5/0053; H04L 27/261; H04W 84/12
See application file for complete search history.

(56) References Cited

U.S. PATENT DOCUMENTS 9,686,757 B1 * 6/2017 Lee ..................... H04L 5/0021
2015/0117428 A1 4/2015 Lee et al.
(Continued)

FOREIGN PATENT DOCUMENTS

CN 106685578 A 5/2017
WO WO-2020027802 A1 * 2/2020 ......... H04L 27/0006

OTHER PUBLICATIONS

International Search Report, mailed Jun. 4, 2020, for corresponding International Application No. PCT/SG2020/050107, 3 pages.
(Continued)

*Primary Examiner* — Vinncelas Louis
(74) *Attorney, Agent, or Firm* — Seed Intellectual Property Law Group LLP

(57) ABSTRACT

The present disclosure provides communication apparatus and communication method for PPDU format identification. The communication apparatus includes circuitry adapted to generate a Physical Layer Protocol Data Unit, PPDU, that contains a first signal field, a second signal field and a third signal field; and a transmitter adapted to transmit the generated PPDU, wherein the second signal field indicates whether a physical layer, PHY, version of the generated PPDU is not older than a defined PHY version, and the third signal field contains version independent bits comprising a PHY version identifier that indicates the PHY version of the generated PPDU.

12 Claims, 18 Drawing Sheets

(56) References Cited

U.S. PATENT DOCUMENTS

| | | | |
|---|---|---|---|
| 2015/0172011 A1* | 6/2015 | Aboul-Magd | H04L 5/0091 |
| | | | 370/330 |
| 2018/0048503 A1 | 2/2018 | Kim et al. | |
| 2020/0076552 A1* | 3/2020 | Cherian | H04B 7/024 |
| 2020/0322193 A1* | 10/2020 | Lee | H04L 27/0008 |
| 2021/0385112 A1* | 12/2021 | Yoshikawa | H04L 69/322 |

OTHER PUBLICATIONS

Indian Office Action, dated Mar. 4, 2024, for Indian Application No. 202147041963, 8 pages.

Lanante et al., "Extensible Preamble Format Design," doc.: IEEE 802.11-15/0853r3, Sep. 2015, 15 pages.

* cited by examiner

COMMUNICATION APPARATUS AND COMMUNICATION METHOD FOR PPDU FORMAT IDENTIFICATION

TECHNICAL FIELD

The present disclosure relates to communication apparatuses and methods for PPDU (Physical Layer Protocol Data Unit) format identification, and more particularly to communication apparatuses and methods for identifying the format of a post-HE (post High Efficiency) PPDU in an efficient manner.

BACKGROUND

In the standardization of next generation wireless local area network (WLAN), a new radio access technology having backward compatibilities with IEEE 802.11a/b/g/n/ac/ax technologies has been discussed in the IEEE 802.11 Working Group, and is named Extremely High Throughput (EHT) WLAN.

In EHT WLAN, in order to provide significant peak throughput and capacity increase beyond 802.11ax high efficiency (HE) WLAN, it is desired to increase the maximum channel bandwidth from 160 MHz to 320 MHz.

However, there has been no discussion on communication apparatuses and methods for PPDU format identification in the context of EHT WLAN.

There is thus a need for communication apparatuses and methods that provide feasible technical solutions for PPDU format identification in the context of EHT WLAN. Furthermore, other desirable features and characteristics will become apparent from the subsequent detailed description and the appended claims, taken in conjunction with the accompanying drawings and this background of the disclosure.

SUMMARY

Non-limiting and exemplary embodiments facilitate providing communication apparatuses and communication methods for identifying the format of a post-HE (post High Efficiency) PPDU in an efficient manner.

According to an embodiment of the present disclosure, there is provided a communication apparatus comprising: circuitry which, in operation, generates a Physical Layer Protocol Data Unit (PPDU) that contains a first signal field, a second signal field and a third signal field, and wherein the second signal field is used to determine whether a physical layer (PHY) version of the generated PPDU is not older than a defined PHY version, and the third signal field is used to indicate the PHY version of the generated PPDU; and a transmitter which, in operation, transmits the generated PPDU.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which:

FIG. 10 shows a format of the Format Identification field (FIF) according to a second embodiment.

Figure 1A:
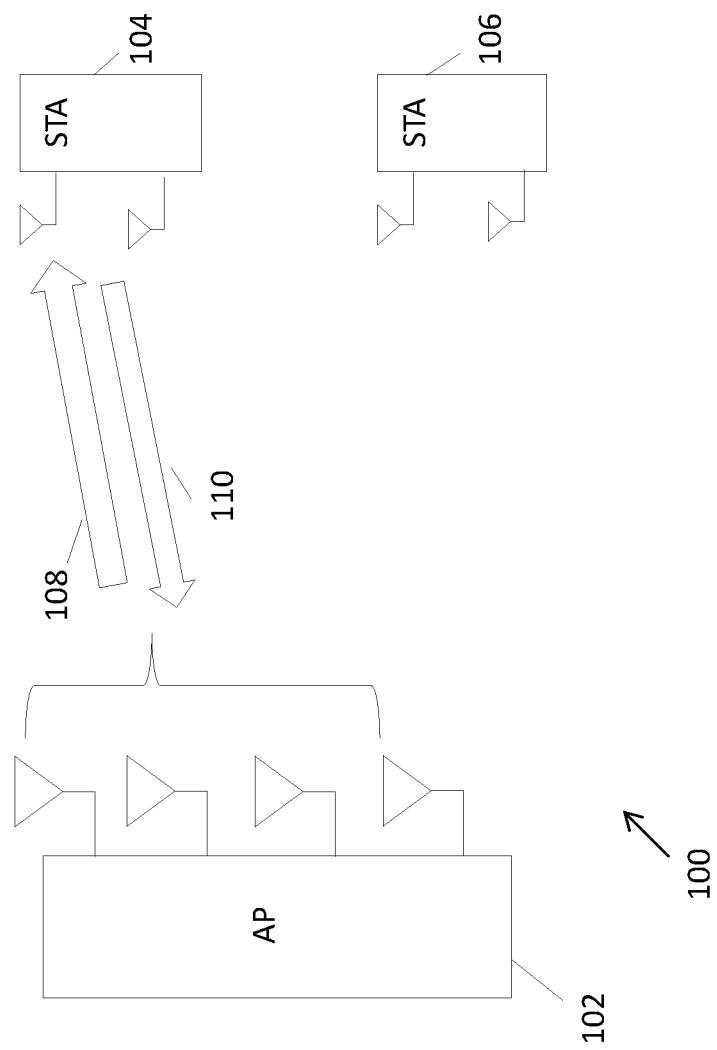
FIG. 1A depicts a schematic diagram of uplink and downlink single-user multiple input multiple output (MIMO) communications between an access point (AP) and a station (STA) in a MIMO wireless network.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help an accurate understanding of the present embodiments.

DETAILED DESCRIPTION

Some embodiments of the present disclosure will be described, by way of example only, with reference to the drawings. Like reference numerals and characters in the drawings refer to like elements or equivalents.

In the following paragraphs, certain exemplifying embodiments are explained with reference to an access point (AP) and a station (STA) for communication including post-HE PPDUs.

In the context of IEEE 802.11 (Wi-Fi) technologies, a station, which is interchangeably referred to as a STA, is a communication apparatus that has the capability to use the 802.11 protocol. Based on the IEEE 802.11-2016 definition, a STA can be any device that contains an IEEE 802.11-conformant media access control (MAC) and physical layer (PHY) interface to the wireless medium (WM).

For example, a STA may be a laptop, a desktop personal computer (PC), a personal digital assistant (PDA), an access point or a Wi-Fi phone in a wireless local area network (WLAN) environment. The STA may be fixed or mobile. In the WLAN environment, the terms "STA", "wireless client", "user", "user device", and "node" are often used interchangeably.

Likewise, an AP, which may be interchangeably referred to as a wireless access point (WAP) in the context of IEEE 802.11 (Wi-Fi) technologies, is a communication apparatus that allows STAs in a WLAN to connect to a wired network. The AP usually connects to a router (via a wired network) as a standalone device, but it can also be integrated with or employed in the router.

As mentioned above, a STA in a WLAN may work as an AP at a different occasion, and vice versa. This is because communication apparatuses in the context of IEEE 802.11 (Wi-Fi) technologies may include both STA hardware components and AP hardware components. In this manner, the communication apparatuses may switch between a STA mode and an AP mode, based on actual WLAN conditions and/or requirements.

In a MIMO wireless network, "multiple" refers to multiple antennas used simultaneously for transmission and multiple antennas used simultaneously for reception, over a radio channel. In this regard, "multiple-input" refers to multiple transmitter antennas, which input a radio signal into the channel, and "multiple-output" refers to multiple receiver antennas, which receive the radio signal from the channel and into the receiver. For example, in an N×M MIMO network system, N is the number of transmitter antennas, M is the number of receiver antennas, and N may or may not be equal to M. For the sake of simplicity, the respective numbers of transmitter antennas and receiver antennas are not discussed further in the present disclosure.

In a MIMO wireless network, single-user communications and multiuser communications can be deployed for communications between communication apparatuses such as APs and STAs.

FIG. 1A depicts a schematic diagram of single-user (SU) MIMO communications 100 between an AP 102 and a STA 104 in a MIMO wireless network. As shown, the MIMO wireless network may include one or more STAs (e.g. STA 104, STA 106, etc.). In the SU-MIMO communications 100, the AP 102 transmits multiple spatial streams using multiple antennas (e.g. 4 antennas as shown in FIG. 1A) with all the spatial streams directed to a single communication apparatus, i.e. the STA 104. For the sake of simplicity, the multiple spatial streams directed to the STA 104 are illustrated as a grouped data transmission arrow 108 directed to the STA 104.

The SU-MIMO communications 100 can be configured for bi-directional transmissions. As shown in FIG. 1A, in the SU-MIMO communications 100, the STA 104 may transmit multiple spatial streams using multiple antennas (e.g. 2 antennas as shown in FIG. 1A) with all the spatial streams directed to the AP 102. For the sake of simplicity, the multiple spatial streams directed to the AP 102 are illustrated as a grouped data transmission arrow 110 directed to the AP 102.

As such, the SU-MIMO communications 100 depicted in FIG. 1A enables both uplink single-user transmissions and downlink single-user transmissions in a MIMO wireless network.

Figure 1B:
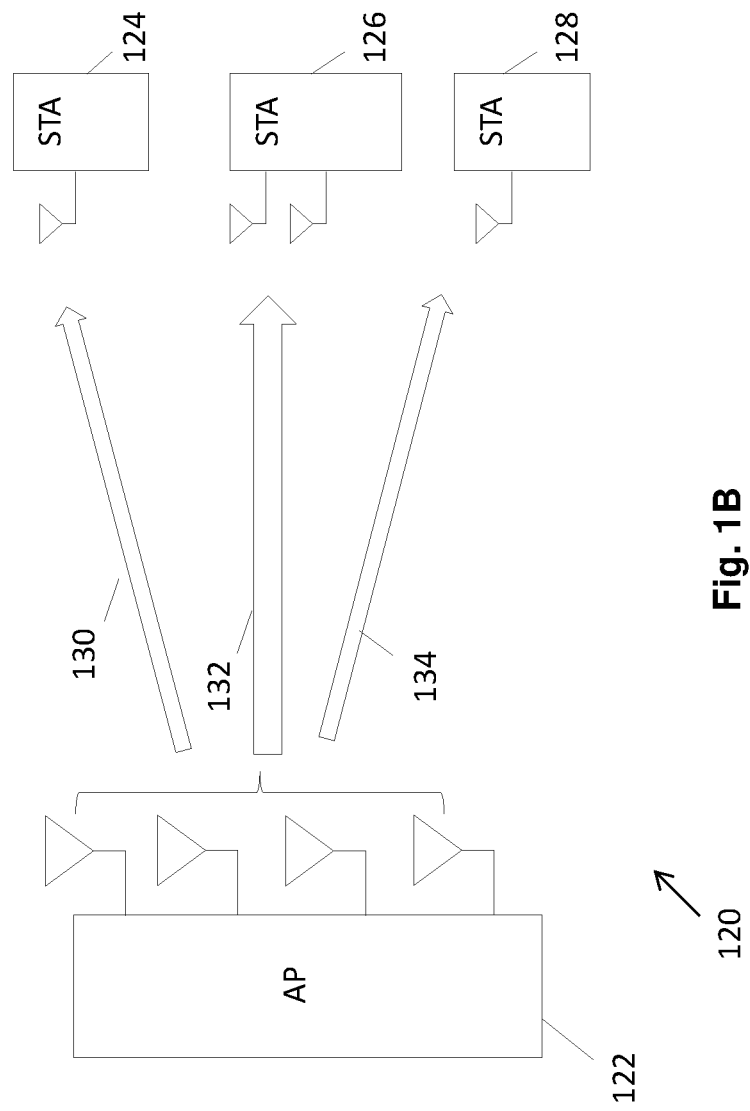
FIG. 1B depicts a schematic diagram of downlink multiuser MIMO communications between an AP and multiple STAs in a MIMO wireless network.

FIG. 1B depicts a schematic diagram of downlink multiuser (MU) MIMO communications 120 between an AP 122 and multiple STAs 124, 126, 128 in a MIMO wireless network.

The MIMO wireless network may include one or more STAs (e.g. STA 124, STA 126, STA 128, etc.). In the downlink MU-MIMO communications 120, the AP 122 transmits multiple streams simultaneously to the STAs 124, 126, 128 in the network using multiple antennas via spatial mapping or precoding techniques. For example, two spatial streams may be directed to the STA 126, another spatial stream may be directed to the STA 124, and yet another spatial stream may be directed to the STA 128. For the sake of simplicity, the two spatial streams directed to the STA 126 are illustrated as a grouped data transmission arrow 132, the spatial stream directed to the STA 124 is illustrated as a data transmission arrow 130, and the spatial stream directed to the STA 128 is illustrated as a data transmission arrow 134.

Due to packet/PPDU (Physical Layer Protocol Data Unit) based transmission and distributed MAC scheme in 802.11 WLAN, time scheduling (e.g. TDMA (time division multiple access)-like periodic time slot assignment for data transmission) does not exist in 802.11 WLAN. Frequency and spatial resource scheduling is performed on a packet basis. In other words, resource allocation information is on a PPDU basis.

In 802.11n (WiFi 4) technology, HT (High Throughput) mixed format PPDUs are used in practice for uplink or downlink single-user transmission. Due to support of 40 MHz channel bandwidth and SU-MIMO transmission, the 802.11n technology is capable of offering higher system throughput than the 802.11a/b/g technology. Notice that in 802.11a/b/g technology, non-HT PPDUs are used for uplink or downlink single-user transmission.

In 802.11ac (WiFi 5) technology, VHT (Very High Throughput) PPDUs are used for uplink or downlink single-user transmission as well as downlink multiuser transmission, e.g. full-bandwidth MU-MIMO transmission. Due to support of 160 MHz channel bandwidth and MU-MIMO transmission, the 802.11ac technology is able to provide much higher system throughput than the 802.11 n technology.

In 802.11ax (WiFi 6) technology, there are three main types of HE PPDU: HE SU PPDU, HE MU PPDU and HE TB (Trigger-Based) PPDU. HE SU PPDUs are used for uplink or downlink single-user transmission. HE MU PPDUs are mainly used for downlink multiuser transmission, e.g., OFDMA (Orthogonal Frequency Division Multiple Access) transmission including MU-MIMO transmission in a single RU (Resource Unit) and full-bandwidth MU-MIMO transmission. HE TB PPDUs are used for uplink multiuser transmission, e.g. OFDMA transmission including MU-MIMO transmission in a single RU and full-bandwidth MU-MIMO transmission. Due to support of OFDMA, the 802.11ax technology is able to enhance the system throughput in high density scenarios of APs and/or STAs compared to the 802.11ac technology.

Similar to the 802.11ax (WiFi 6) technology, there may have three main types of EHT PPDU: EHT SU PPDU, EHT MU PPDU and EHT TB PPDU. EHT SU PPDUs are used for uplink or downlink single-user transmission. EHT MU PPDUs are mainly used for downlink multiuser transmission, e.g., OFDMA transmission including MU-MIMO transmission in a single RU and full-bandwidth MU-MIMO transmission. EHT TB PPDUs are used for uplink multiuser transmission, e.g. OFDMA transmission including MU-MIMO transmission in a single RU and full-bandwidth MU-MIMO transmission. Due to support of 320 MHz channel bandwidth, 16 spatial streams and multi-band operation, the EHT technology is able to significantly boost system throughput compared to the 802.11ax technology.

Figure 1C:
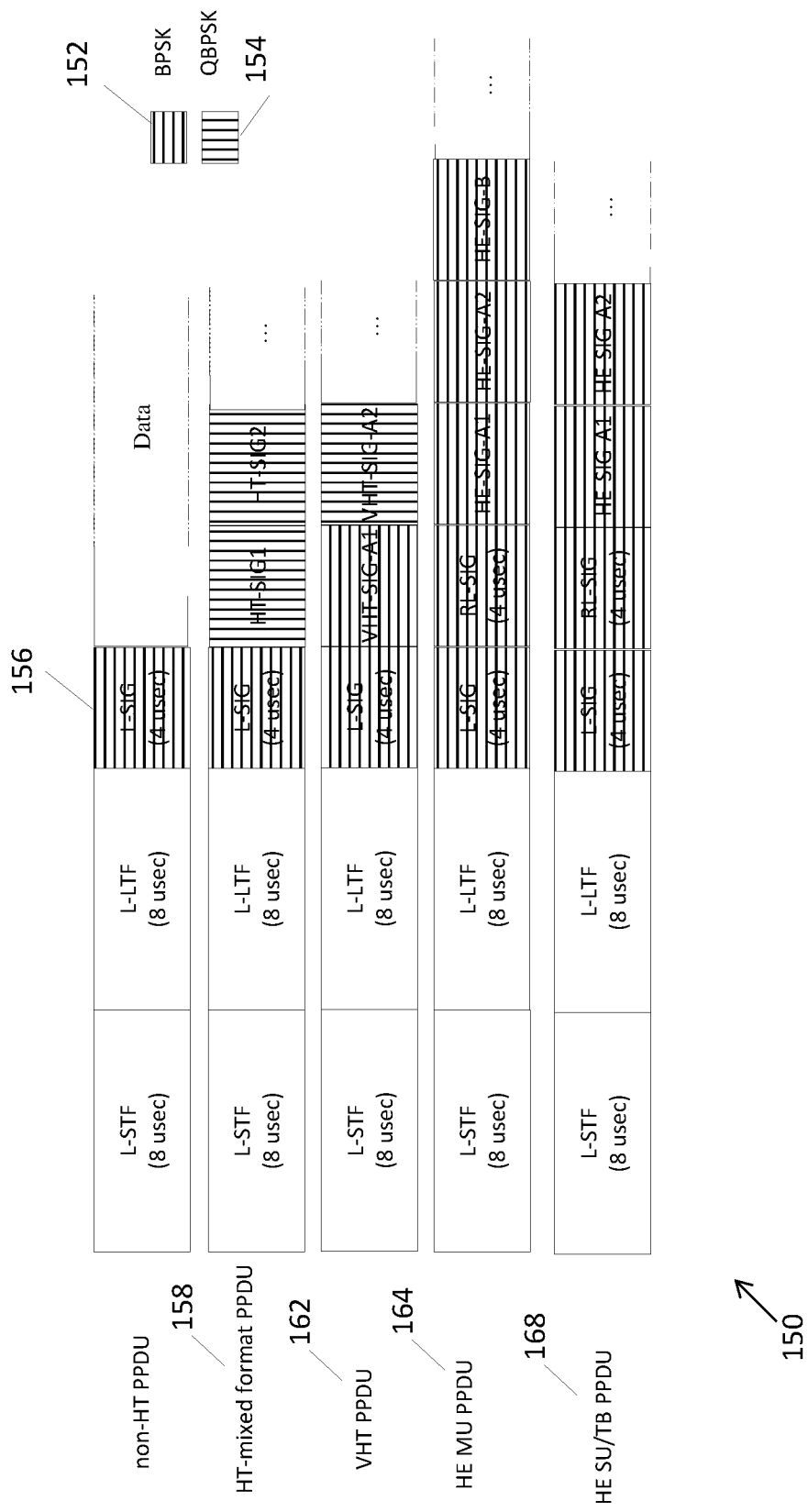

FIG. 1C shows an illustration 150 of some existing 802.11 pre-EHT PPDU formats. Pre-EHT PPDUs may refer to HE PPDUs, VHT PPDUs, HT PPDUs or non-HT PPDUs. Various fields may be BPSK (Binary Phase Shift Keying) modulated (like indicated by horizontal lines 152 in the respective fields. Various fields may be QBPSK (Quadrature Binary Phase Shift Keying) modulated (like indicated by vertical lines 154 in the respective fields. Various PPDUs include an L-SIG (non-HT SIGNAL field) (as illustrated in column 156 of FIG. 1C). The RATE field of the L-SIG in a HT-mixed format PPDU, VHT PPDU, or HE PPDU is set to "1101" for the rate of 6 Mbps. The LENGTH field of the L-SIG in a HT-mixed format PPDU 158, or VHT PPDU 162 is set to a value divisible by 3. The LENGTH field of the L-SIG in a HE PPDU 164, 168 is set to a value not divisible by 3. The LENGTH field value of the L-SIG divided by 3 has a modulo of 1 for a HE MU PPDU 164; otherwise has a modulo of 2. The Format field value of the HE-SIG-A (High Efficiency SIGNAL A field) is used to differentiate a HE SU PPDU from a HE TB PPDU 168. Notice that a HE PPDU 164, 168 has a RL-SIG (Repeated Non-HT SIGNAL field) after the L-SIG, a VHT PPDU 162 has a VHT-SIG-A (Very High Throughput SIGNAL A field) after the L-SIG, and a non-HT PPDU has a SERVICE field of the Data field after the L-SIG.

According to various embodiments, methods and devices may be provided for identifying the format of a post-HE PPDU in an efficient manner. A post-HE PPDU may refer to an EHT PPDU or a future PPDU which is back-compatible with EHT PPDU as well as any pre-EHT PPDU. It is appreciable that if the IEEE 802.11 Working Group may use a new name instead of "EHT WLAN" for the next generation WLAN with an extremely high throughput, the prefix "EHT" in the above fields may change accordingly.

According to various embodiments, a two-stage PPDU format identification may be provided. Coarse PPDU format identification may be provided to identify whether a received PPDU is a possible post-HE PPDU. Fine PPDU format identification may be provided to double check whether the received PPDU is a post-HE PPDU and identify its format if it is a post-HE PPDU. According to various embodiments, a PPDU format identification may be provided to determine whether a physical layer (PHY) version of a generated PPDU is not older than a defined PHY version, and to indicate the PHY version of the generated PPDU.

Figure 2:
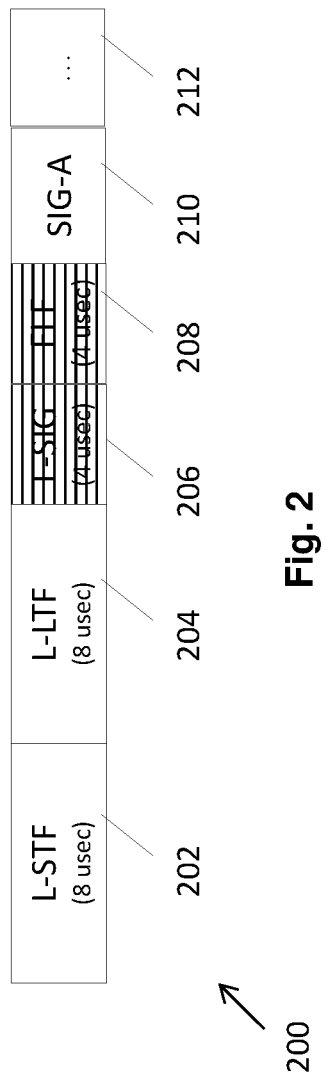
FIG. 2 shows a format of a post-HE PPDU according to various embodiments.

FIG. 2 shows a format of a post-HE PPDU 200 according to various embodiments. In various embodiments, a post-HE PPDU may be an EHT PPDU or a future PPDU which is back-compatible with EHT PPDU as well as any pre-EHT PPDU. The post-HE PPDU 200 may include a non-High Throughput Short Training Field (L-STF) 202, a non-High Throughput Long Training Field (L-LTF) 204. According to the present disclosure, the post-HE PPDU 200 may further contain a non-High Throughput Signal Field (L-SIG) 206, a Format Identification Field (FIF) 208, a SIGNAL A field (SIG-A) 210, and further fields 212. The post-HE PPDU 200 may include the FIF 208 after the L-SIG 206, and the FIF 208 may include a single OFDM symbol having a duration of 4 us, including 48 data tones, 4 pilot tones and 4 extra tones, and may be BPSK modulated. The FIF 208 may include information used for both coarse PPDU format identification and fine PPDU format identification.

The SIG-A field 210 and the further fields 212 may vary according to the PPDU format and may be decoded based on the fine PPDU format identification.

In addition, similar to a HE PPDU, the RATE field of the L-SIG 206 in a post-HE PPDU 200 is set to "1101" for the rate of 6 Mbps and the LENGTH field of the L-SIG 206 in a post-HE PPDU 200 is set to a value which is not divisible by 3, which may be used for fine PPDU format identification as well.

According to various embodiments, identification of the format of any post-HE PPDU may be provided in an efficient manner. In addition, a single symbol (i.e. FIF symbol 208) is used by a post-HE PPDU 200 for PPDU format identification, which causes similar overhead to a HE PPDU which uses a single RL-SIG symbol.

Figure 3:
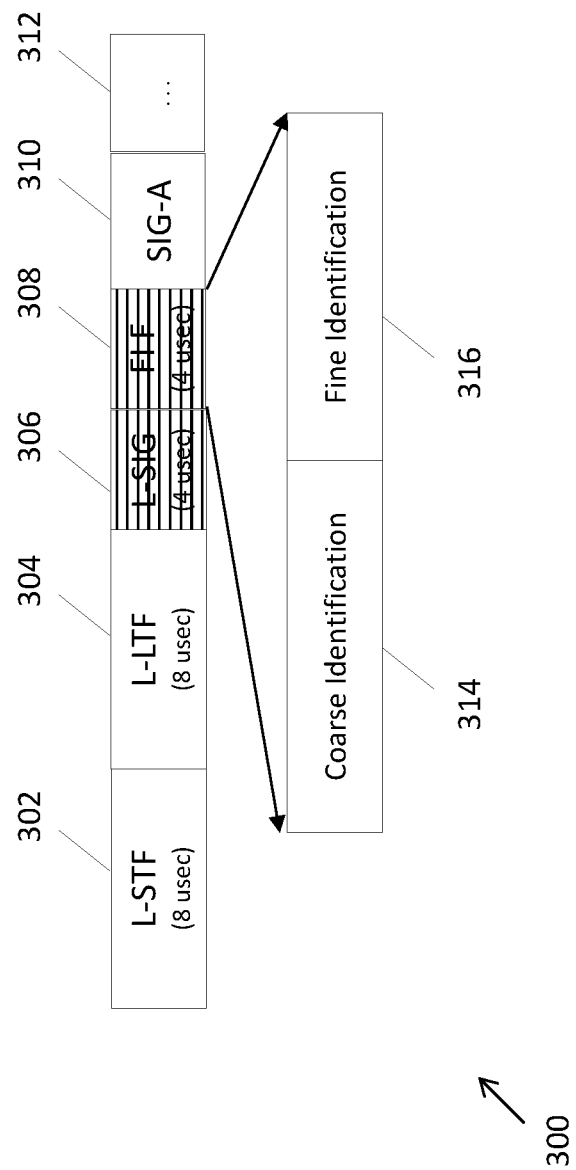
FIG. 3 shows another format of a post-HE PPDU according to various embodiments.

FIG. 3 shows another format of a post-HE PPDU 300 according to various embodiments. A post-HE PPDU may be an EHT PPDU or a future PPDU which is back-compatible with EHT PPDU as well as any pre-EHT PPDU. The post-HE PPDU 300 may include fields that are similar or identical to the fields of the post-HE PPDU 200, comprising a L-STF 302, a L-LTF 304, a first signal field such as L-SIG field, a FIF 308 and a SIG-A field 310. The FIF 308 may include a second signal field such as Coarse Identification subfield 314 and a third signal field such as Fine Identification subfield 316. The Coarse Identification subfield 314 may be used for coarse PPDU format identification (i.e. used to determine whether a PHY version of the post-HE PPDU 300 is not older than a defined PHY version, e.g. EHT PPDU) and may be generated according to a determined subset of tones of the L-SIG symbol. The determined subset of tones may include N data tones where 8≤N≤32, and N is an integer number. Alternatively the determined subset of tones may include N data tones, M pilot tones and L extra tones where M=4 and L=4. The N data tones may be selected from 48 data tones in such a manner that the N data tones are uniformly spread over the transmission bandwidth as much as possible. The Fine Identification subfield 316 may be used for fine PPDU format identification (i.e. used to indicate the PHY version of the post-HE PPDU 400).

In particular, the third signal field, e.g. Fine Identification subfield 316, may be used to indicate the PHY version of the post-HE PPDU 300. In various embodiments, the Fine Identification subfield 316 may contain version independent bits having a defined number of bits and static location in the field. For example, the version independent bits may comprise a PHY version identifier, uplink/downlink flag, basic service set (BSS) color, and transmission opportunity (TXOP) duration. The PHY version identifier is used to identify the exact PHY version starting with 802.11be. Further, the Fine Identification subfield 316 may contain version dependent bits following the version independent bits. In an embodiment, the version dependent bits following the version independent bits have a variable number of bits depending on the PHY version. For example, the version dependent bits may comprise PPDU format, SU/MU flag and bandwidth (BW).

According to various embodiments, the FIF 308 is a repeat of the L-SIG field 306. In particular, the FIF 308 is mapped to tones, and respective values of the FIF 308 at a part of the tones are generated according to corresponding values of the L-SIG field 306 at the part of the tones. In an embodiment, the respective values of the FIF 308 at a part of the tones are inverted from corresponding values of the L-SIG field 306 at the part of the tones. The tones may be data tones or data subcarriers. For example, the Coarse Identification subfield 314 may be generated using tone value inversion and tone mapping. For tone value inversion, the values of a determined subset of tones of the L-SIG symbol may be inverted. For tone mapping, the inverted values of the determined subset of tones of the L-SIG symbol may be mapped to the same tones of the FIF symbol.

Figure 4A:
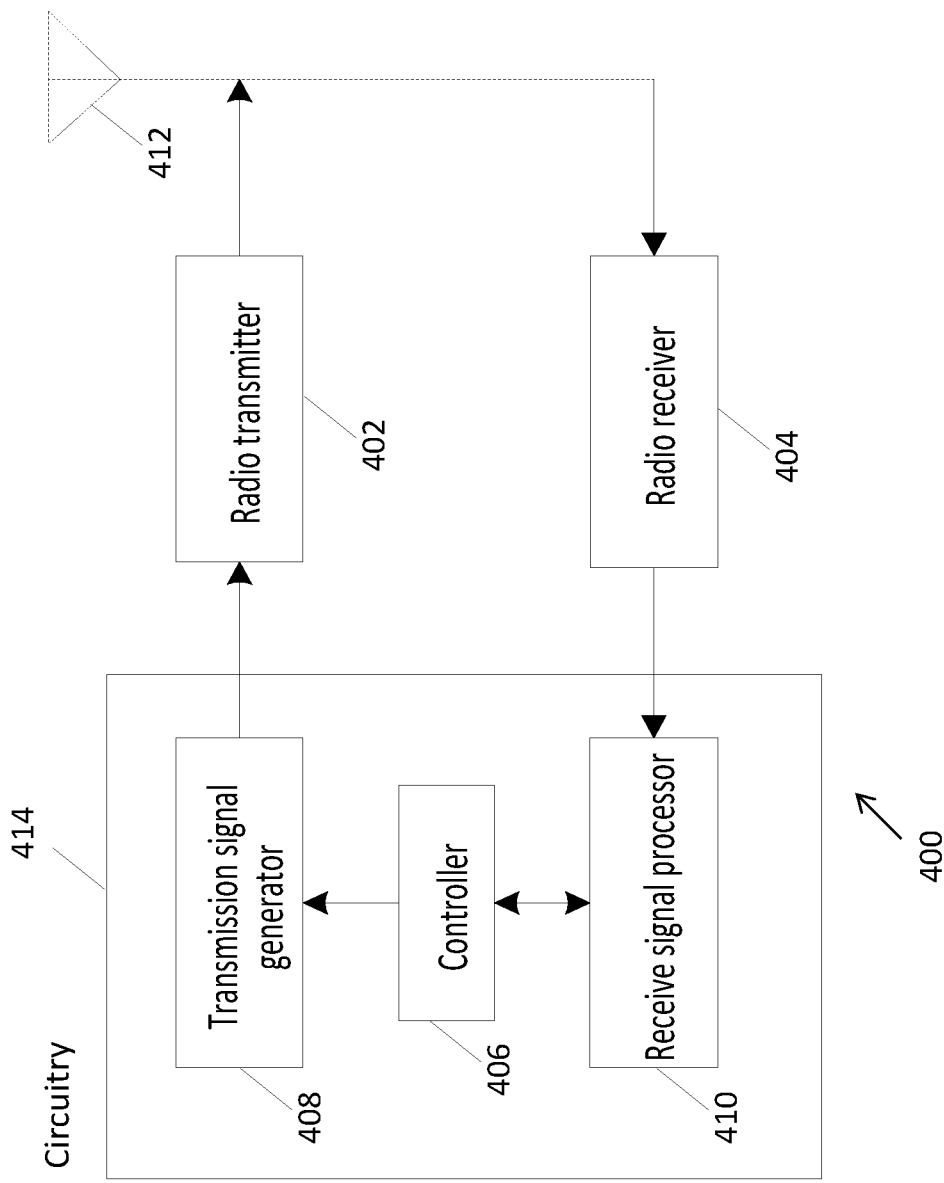
FIG. 4A shows a schematic, partially sectioned view of a communication apparatus, for example an AP or a STA, according to various embodiments.

FIG. 4A shows a schematic, partially sectioned view of a communication apparatus 400 according to various embodiments. The communication apparatus 400 may be implemented as an AP or a STA according to various embodiments.

As shown in FIG. 4A, the communication apparatus 400 may include circuitry 414, at least one radio transmitter 402, at least one radio receiver 404, and multiple antennas 412 (for the sake of simplicity, only one antenna is depicted in FIG. 4A for illustration purposes). The circuitry 414 may include at least one controller 406 for use in software and hardware aided execution of tasks that the controller 406 is designed to perform, including control of communications with one or more other communication apparatuses in a MIMO wireless network. The circuitry 414 may furthermore include at least one transmission signal generator 408 and at least one receive signal processor 410. The at least one controller 406 may control the at least one transmission signal generator 408 for generating PPDUs (for example post-HE PPDUs) to be sent through the at least one radio transmitter 402 to one or more other communication apparatuses and the at least one receive signal processor 410 for processing PPDUs received through the at least one radio receiver 404 from the one or more other communication apparatuses under the control of the controller 406. The at least one transmission signal generator 408 and the at least one receive signal processor 410 may be stand-alone modules of the communication apparatus 400 that communicate with the at least one controller 306 for the above-mentioned functions, as shown in FIG. 4A. Alternatively, the at least one transmission signal generator 408 and the at least one receive signal processor 410 may be included in the at least one controller 406. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 402, at least one radio receiver 404, and at least one antenna 412 may be controlled by the at least one controller 406.

For example, the communication apparatus 400 may be an AP or a STA, and the circuitry 414 (for example the transmission signal generator 408 of the circuitry 314) may, in operation, generate a transmission signal, for example a PPDU (Physical Layer Protocol Data Unit), that comprises a legacy signal field and a non-legacy signal field, the legacy signal field comprising an OFDM (Orthogonal Frequency Division Multiplexing) symbol. The radio transmitter 402 may, in operation, transmit the generated transmission signal (for example PPDU). The non-legacy signal field may include an OFDM symbol and contains information used for coarse PPDU format identification and fine PPDU format identification. The coarse PPDU format identification may comprise identification of a possible post-HE (post High Efficiency) PPDU and the fine PPDU format identification may comprise identification of the format of a post-HE PPDU.

The non-legacy signal field may include a first subfield that is used for the coarse PPDU format identification and a second subfield that is used for the fine PPDU format identification, the first subfield being formatted according to a subset of tones of the legacy signal field symbol.

The second subfield may include a signaling to indicate the format of the post-HE PPDU and is mapped to the tones of the non-legacy signal field symbol which are different from the determined subset of tones.

The first subfield may include the subset of tones of the non-legacy signal field symbol, wherein the values of the subset of tones are inverted from the values of the corresponding tones of the legacy signal field symbol. The subset of tones of the non-legacy signal field symbol may be determined in such a manner that the subset of tones are uniformly spread over the transmission bandwidth as much as possible. The subset of tones of the non-legacy signal field symbol may be determined based on a determined number of LSBs (least significant bits) of the non-legacy signal field. A first subfield may include a signature sequence. A pattern of a subset of consecutive bits in the signature sequence may be different from that of the corresponding bits in the RL-SIG (Repeated Non-HT SIGNAL field) of a HE (High Efficiency) PPDU.

According to various embodiments, the transmission signal generator 308 of the circuitry may, in operation, generate a post-HE PPDU that includes a legacy signal field followed by a non-legacy signal field, the legacy signal field comprising a single OFDM symbol; and the radio transmitter 302 may, in operation, transmits the generated PPDU; wherein the non-legacy signal field comprises a single OFDM symbol and contains information used for both coarse PPDU format identification and fine PPDU format identification.

The non-legacy signal field may include a first subfield that is used for coarse PPDU format identification and a second subfield that is used for fine PPDU format identification, the first subfield being formatted according to a determined subset of tones of the legacy signal field symbol (for example according to the first embodiment).

The first subfield may include the determined subset of tones of the non-legacy signal field symbol, whose values are inverted from the values of the corresponding tones of the legacy signal field symbol.

The second subfield may include a signaling to indicate the format of the post-HE PPDU and is mapped to the tones of the non-legacy signal field symbol which are different from the determined subset of tones.

The non-legacy signal field may include a first subfield that is used for coarse PPDU format identification and a second subfield that is used for fine PPDU format identification, the first subfield including a signature sequence (for example according to the second embodiment).

A pattern of a subset of consecutive bits in the signature sequence may different from that of the corresponding bits in the RL-SIG of a HE PPDU.

For example, the communication apparatus 400 may be an AP or a STA, and the circuitry 414 (for example the transmission signal generator 408 of the circuitry 414) may, in operation, generate a transmission signal, for example a PPDU, that comprises first signal field, a second signal field and a third signal field, and wherein the second signal field is used to determine whether a physical layer (PHY) version of the generated PPDU is not older than a defined PHY version, and the third signal field Is used to indicate the PHY version for the generated PPDU. The radio transmitter 402 may, in operation, transmit the generated transmission signal (for example PPDU). In an embodiment, a PPDU for the defined PHY version is an EHT PPDU.

The third signal field may include version independent bits having a defined number of bits and static location in the third signal field. In an embodiment, the generated PPDU contains version dependent bits following the version independent bits. In another embodiment, the version dependent bits have variable number of bits.

The second signal field may be a repeat of the first signal field. In an embodiment, the second signal field is mapped to tones, and respective values of the second signal field at a part of the tones are generated according to corresponding values of the first signal field at the part of the tones. In another embodiment, respective values of the second signal field at a part of the tones may be inverted from corresponding values of the first signal field at the part of the tones. Yet in another embodiment, the tones are data subcarriers.

In various embodiments, the second signal field and the third signal field may be encoded in a single OFDM symbol. The first signal field and the second signal field may be used to determine whether the PHY version of the generated PPDU is not older than the define PHY version.

For example, the communication apparatus 300 may be an AP or a STA, and the radio receiver 304 may, in operation receive a transmission signal, for example a PPDU (Physical Layer Protocol Data Unit), that comprises a legacy signal field and a non-legacy signal field, the legacy signal field comprising an OFDM (Orthogonal Frequency Division Multiplexing) symbol. Furthermore, circuitry 314 (for example the receive signal processor 310 of the circuitry 314) may, in operation, process the received transmission signal. The non-legacy signal field may include an OFDM symbol and contains information used for coarse PPDU format identification and fine PPDU format identification. The coarse PPDU format identification may comprise identification of a possible post-HE (post High Efficiency) PPDU, and the fine PPDU format identification may comprise identification of the format of a post-HE PPDU.

The non-legacy signal field may include a first subfield that is used for the coarse PPDU format identification and a second subfield that is used for the fine PPDU format identification, the first subfield being formatted according to a subset of tones of the legacy signal field symbol.

The second subfield may include a signaling to indicate the format of the post-HE PPDU and is mapped to the tones of the non-legacy signal field symbol which are different from the determined subset of tones. The first subfield may include the subset of tones of the non-legacy signal field symbol, wherein the values of the tones of the subset of tones are inverted from the values of the corresponding tones of the legacy signal field symbol. The subset of tones of the non-legacy signal field symbol may be determined in such a manner that the subset of tones are uniformly spread over the transmission bandwidth as much as possible. The subset of tones of the non-legacy signal field symbol may be determined based on a determined number of LSBs (least significant bits) of the non-legacy signal field.

According to various embodiments, a first subfield may comprise a signature sequence. A pattern of a subset of consecutive bits in the signature sequence may be different from that of the corresponding bits in the RL-SIG (Repeated Non-HT SIGNAL field) of a HE (High Efficiency) PPDU.

Figure 4B:
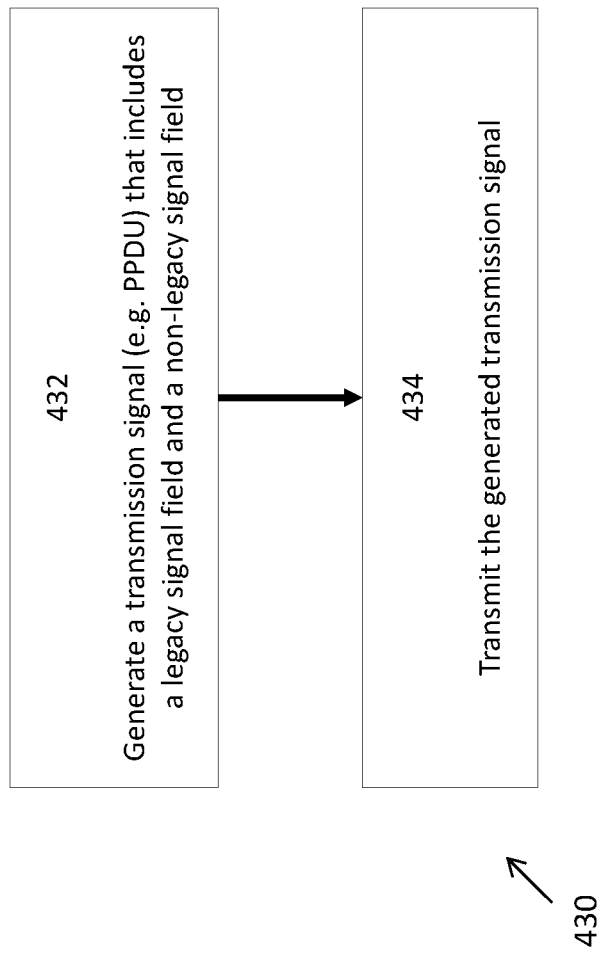
FIG. 4B shows a flow diagram illustrating a communication method according to various embodiments.

FIG. 4B shows a flow diagram 430 illustrating a communication method according to various embodiments. At 432, a transmission signal, for example a PPDU (Physical Layer Protocol Data Unit), may be generated. The transmission signal may include a legacy signal field and a non-legacy signal field. The legacy signal field may include an OFDM (Orthogonal Frequency Division Multiplexing) symbol. At 434, the generated transmission signal (for example PPDU) may be transmitted. The non-legacy signal field may include an OFDM symbol and may include information used for coarse PPDU format identification and fine PPDU format identification. The coarse PPDU format identification may comprise identification of a possible post-HE (post High Efficiency) PPDU. The fine PPDU format identification may comprise identification of the format of a post-HE PPDU.

Figure 4C:
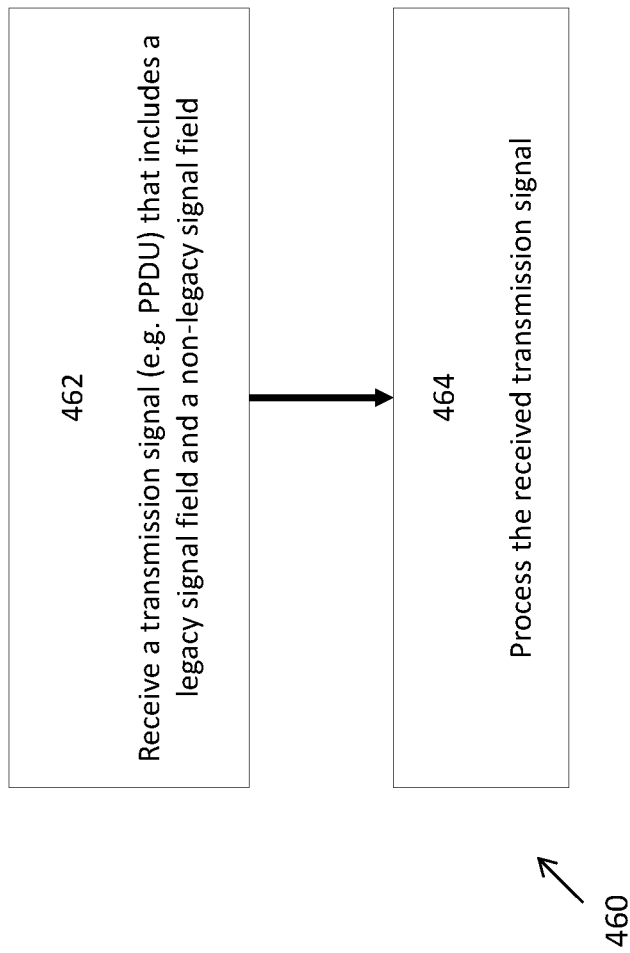
FIG. 4C shows a flow diagram illustrating a communication method according to various embodiments.

FIG. 4C shows a flow diagram 460 illustrating a communication method according to various embodiments. At 462, a transmission signal, for example a PPDU (Physical Layer Protocol Data Unit), may be received. The transmission signal may include a legacy signal field and a non-legacy signal field. The legacy signal field may include an OFDM (Orthogonal Frequency Division Multiplexing) symbol. At 464, the received transmission signal may be processed. The non-legacy signal field may include an OFDM symbol and may include information used for coarse PPDU format identification and fine PPDU format identification. The coarse PPDU format identification may comprise identification of a possible post-HE (post High Efficiency) PPDU and the fine PPDU format identification may comprise identification of the format of a post-HE PPDU.

Figure 4D:
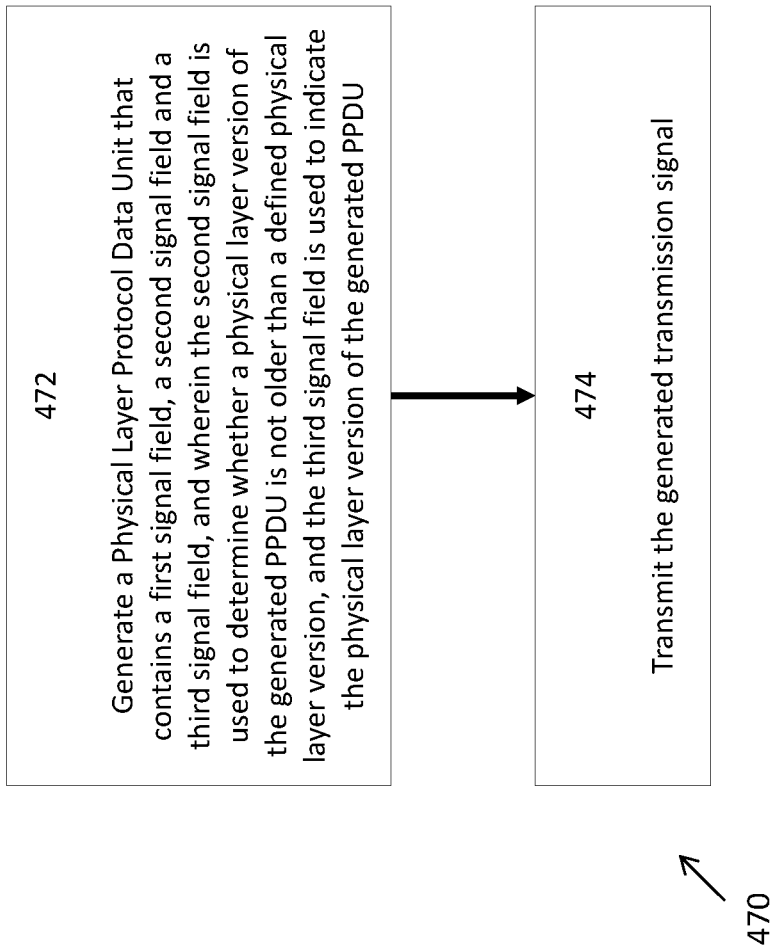
FIG. 4D shows a flow diagram illustrating a communication method according to various embodiments.

FIG. 4D shows a flow diagram 470 illustrating a communication method according to various embodiments. At 472, a transmission signal, for example a PPDU may be generated. The PPDU contains a first signal field, a second signal field and a third signal field, and wherein the second signal field is used to determine whether a PHY version of the generated PPDU is not older than a defined PHY version, and the third signal field is used to indicate the PHY version of the generated PPDU. The second signal field and the third signal field may be encoded in a single OFDM symbol. At 374, the generated PPDU may be transmitted.

Figure 5:
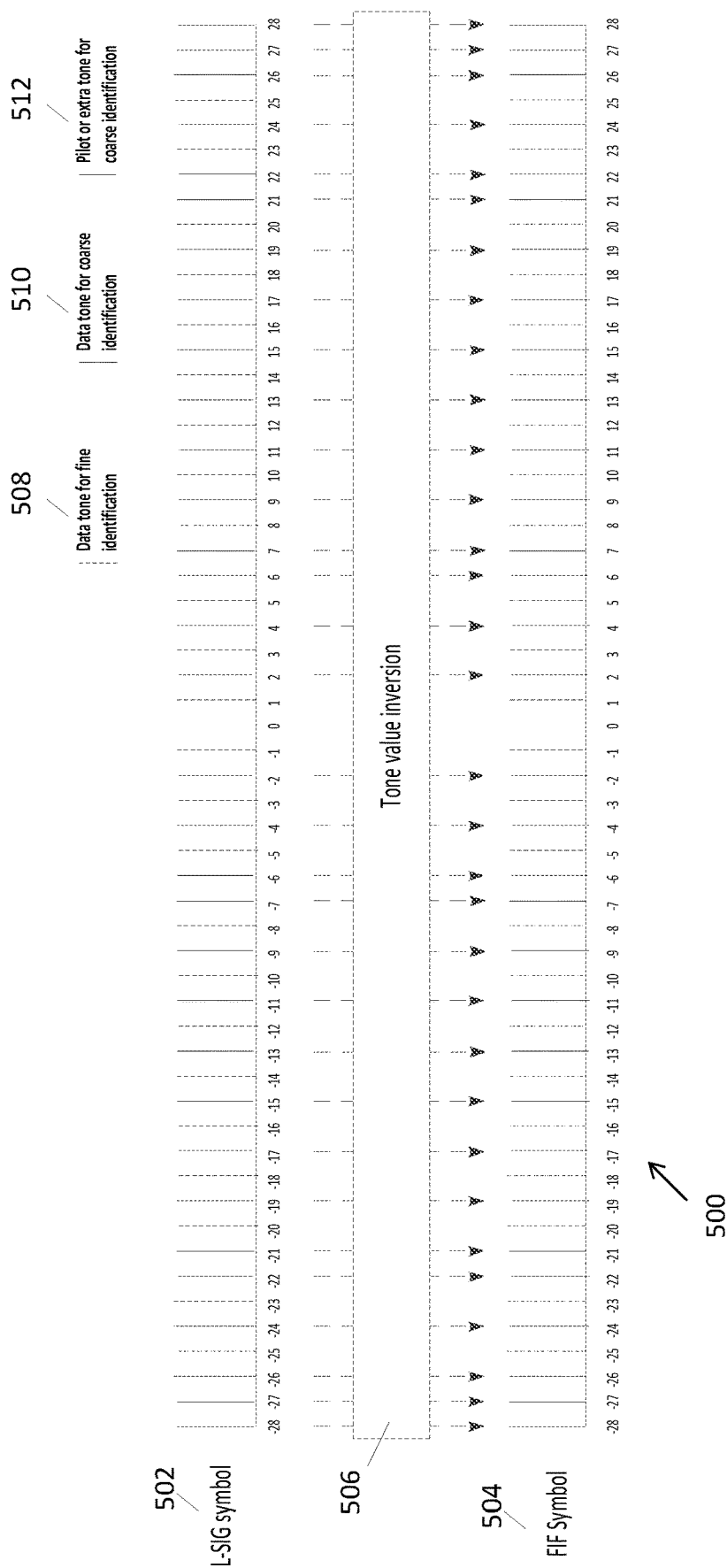
FIG. 5 shows an illustration of an example for generating the Coarse Identification subfield according to the first embodiment.

FIG. 5 shows an illustration 500 of an example for generating the Coarse Identification subfield 314 according to the first embodiment. Tones of the L-SIG symbol 502 and tone of the FIF symbol 504 are illustrated. Data tones for fine identification are indicated by dashed lines 508. Data tones for coarse identification are indicated by thin solid lines 510. Pilot tones and extra tones for coarse identification are indicated by thick solid lines 512. Tone value inversion 506 is only applied to the data tones for coarse identification, and the pilot tones and extra tones. In the example shown in FIG. 5, the determined subset of tones includes N=24 data tones (for coarse identification), M=4 pilot tones and L=4 extra tones. In total, 32 tones are provided for coarse identification, and the Coarse Identification subfield tone indexes are as follows: {±28, ±27, ±26, ±24, ±22, ±21, ±19, ±17, ±15, ±13, ±11, ±9, ±7, ±6, ±4, ±2}. It can be observed from FIG. 5 that the subset of tones of the FIF symbol 504 that are used for coarse identification are determined in such a manner that they are uniformly spread over the transmission bandwidth as much as possible. In such embodiment, the Coarse Identification subfield may be generated according to the corresponding L-SIG symbol 502 at a subset of tones, which include data tones for coarse PPDU format identification. The Coarse Identification subfield is used to determine whether a PHY version of the PPDU is not older than a defined PHY version, e.g. EHT PPDU. In another embodiment, the L-SIG symbol 502 and the Coarse Identification subfield may be used to determine whether the PHY version of the PPDU is not older than the defined PHY version.

Figure 6:
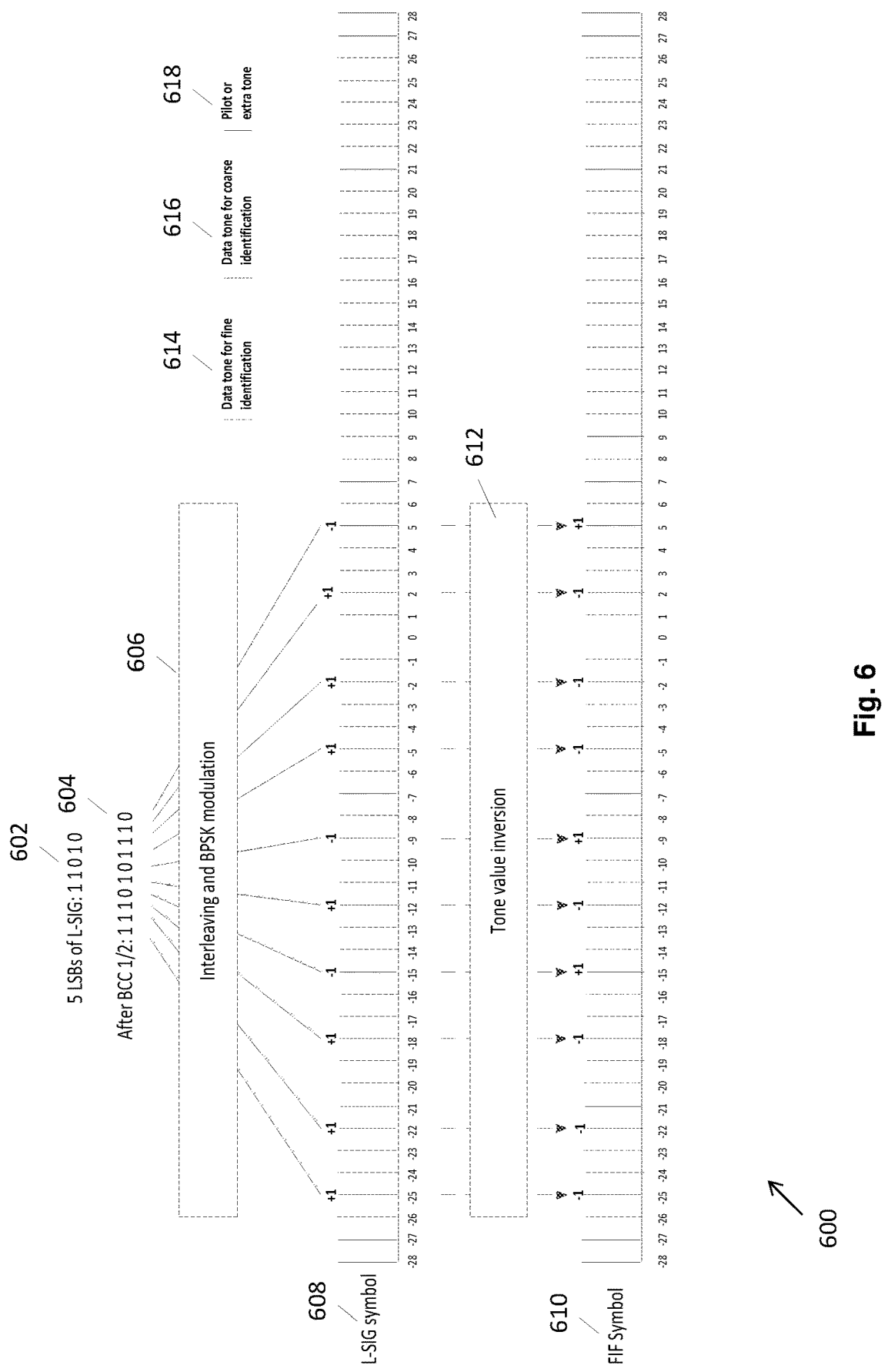
FIG. 6 shows an illustration of another example for generating the Coarse Identification subfield according to the first embodiment.

FIG. 6 shows an illustration 600 of another example for generating the Coarse Identification subfield 314 according to the first embodiment. Tones of the L-SIG symbol 608 and tone of the FIF symbol 610 are illustrated. Data tones for fine identification are indicated by dashed lines 614. Data tones for coarse identification are indicated by thin solid lines 616. Pilot tones and extra tones are indicated by thick solid lines 618. In the example shown in FIG. 6, the determined subset of tones includes N=10 data tones corresponding to 5 LSBs (least significant bits) 602 of the L-SIG field. The 5 LSBs 602 of the L-SIG are fixed to "11010" due to the RATE field of the L-SIG field being set to "1101" for the rate of 6 Mbps and the Reserved field of the L-SIG field being set to "0". After rate ½ BCC (binary convolutional code) encoding, these bits correspond to 1110101110 (bit sequence 604 in FIG. 6). As such, after interleaving and BPSK modulation 606, the theoretical values of the determined subset of tones of the L-SIG symbol are "+1 +1 +1 −1 +1 −1 +1 +1 +1 −1" (like indicated in the L-SIG symbol 608). Thus, the values of the determined subset of tones of the FIF symbol 610 can be compared with the theoretical values (in other words: with the values based on a determined number of LSBs of the L-SIG field) of the same tones of the L-SIG symbol instead of the actual values of the same tones in the L-SIG symbol. Tone value inversion 612 is only applied to the data tones for coarse identification. In total, 10 tones are provided for coarse identification, and the Coarse Identification subfield tone indexes are as follows: {−25, −22, −18, −15, −12, −9, −5, −2, +2, +5}. Similarly in such embodiment, the Coarse Identification subfield may be generated according to the corresponding L-SIG symbol 608 at a subset of tones, which includes data tones for coarse PPDU format identification, derived from LSBs 602 of L-SIG field. The Coarse Identification subfield may be used to determine whether a PHY version of the PPDU is not older than a defined PHY version. In an embodiment, the L-SIG symbol 608 and the Coarse Identification subfield may be used to determine whether the PHY version of the PPDU is not older than the defined PHY version.

Figure 7:
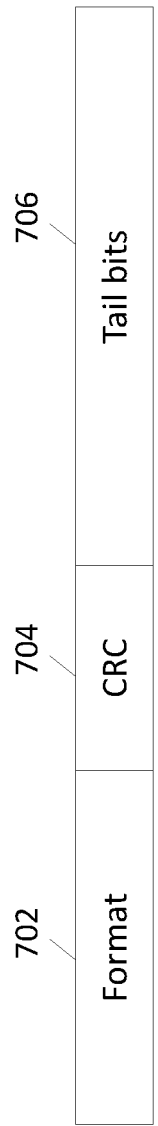
FIG. 7 shows a format of a Fine Identification subfield according to the first embodiment.

FIG. 7 shows a format of a Fine Identification subfield 700 according to the first embodiment. The Fine Identification subfield 700 may include a Format field 702, a CRC (cyclic redundancy check) field 704, and tail bits 706. The Format field 702, which may include L bits, may indicate the format of a post-HE PPDU (i.e. the PHY version of a post-HE PPDU). For example, a value 0 of the Format field may be used to indicate an EHT PPDU, and values from 1 to $2^L-1$ may be reserved for future use. For another example, a value 0 of the Format field may be used to indicate an EHT MU PPDU, a value 1 of the Format field may be used to indicate an EHT SU PPDU or EHT TB PPDU, and values from 2 to $2^L-1$ may be reserved for future use. The CRC field, which may include 18-N/2-L bits, may be calculated over the Format field bits. The tail bits 706, which may include 6 bits, may be set to all-zero. For example, with N=24 and L=4, the Format field 702 includes 4 bits, the CRC field 704 includes 2 bits, and the tail bits 706 include 6 bits.

Figure 8:
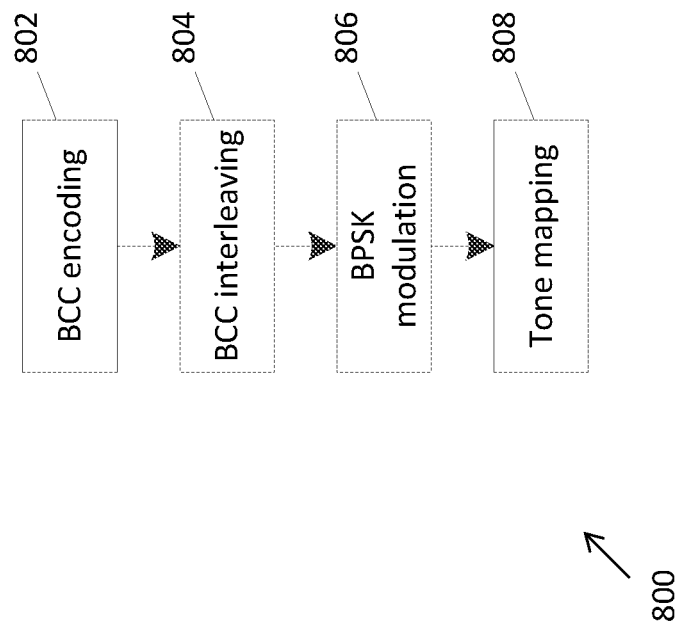
FIG. 8 shows a flow diagram illustrating generation of the Fine Identification subfield according to the first embodiment.

FIG. 8 shows a flow diagram 800 illustrating generation of the Fine Identification subfield according to the first embodiment. In step 802, the (24-N/2)-bit Fine Identification subfield may be encoded with rate ½ BCC and 48-N encoded bits may be generated. In step 804, the 48-N encoded bits may be interleaved. In step 806, the 48-N interleaved bits may be modulated with BPSK. In step 808, the 48-N BPSK symbols may be mapped to the remaining 48-N data tones.

Figure 9:
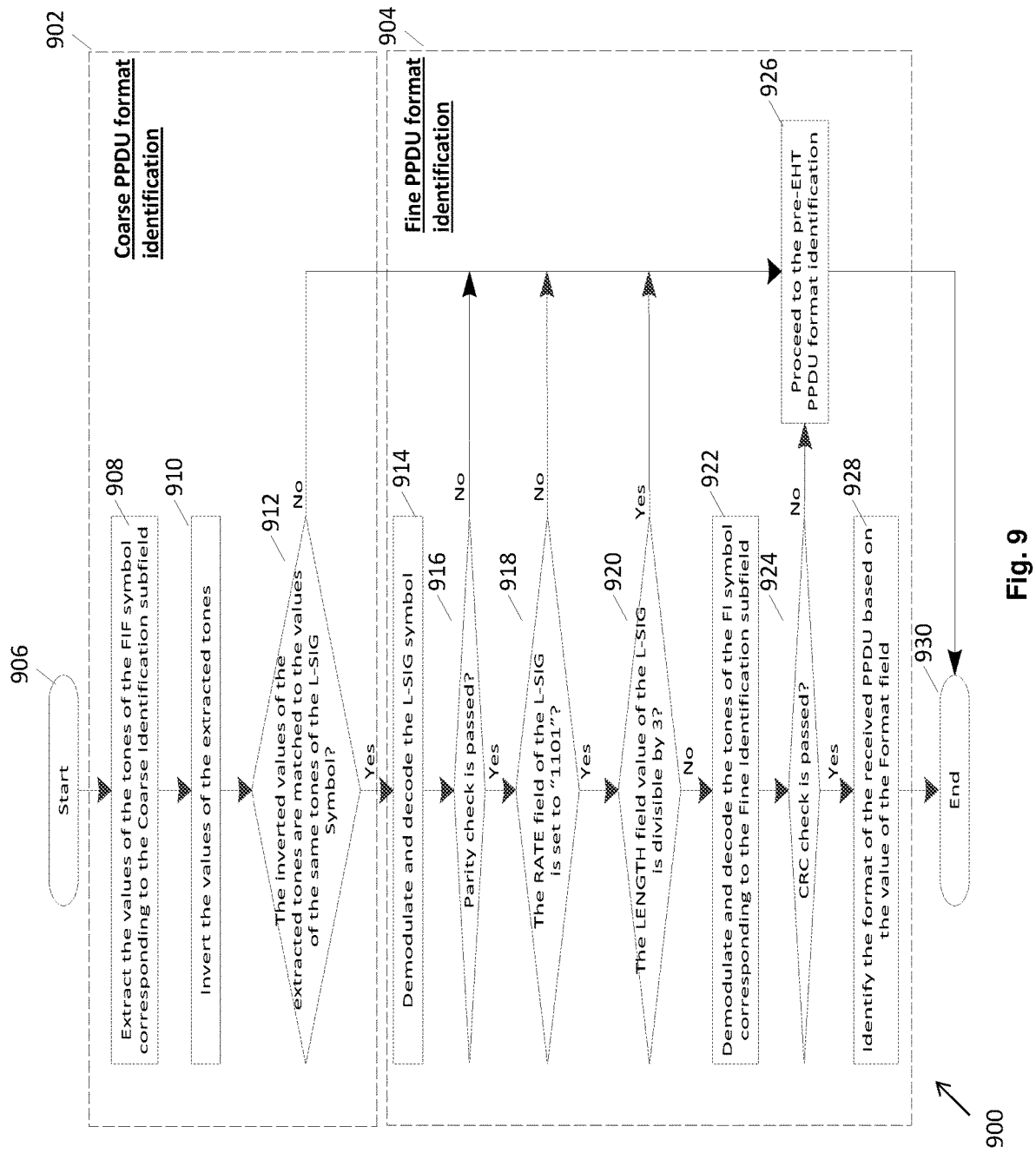
FIG. 9 shows a flow diagram illustrating processing at a STA or at an AP according to the first embodiment.

In the following, processes of how the FIF 308 is used for PPDU format identification, in particular, for determining whether a PHY version of the PPDU is not older than a defined PHY version are demonstrated. FIG. 9 shows a flow diagram 900 illustrating processing at a STA or at an AP according to the first embodiment. Coarse PPDU format identification may be provided, like indicated by dashed box 902. Fine PPDU format identification may be provided, like indicated by dashed box 904. Processing may start at 906. At 908, the values of the tones of the FIF symbol corresponding to the Coarse Identification subfield may be extracted (for example by determining the tones as such, like described with reference to FIG. 5, or for example by determining the tones according to a determined number of LSBs of the L-SIG, like described with reference to FIG. 6). At 910, the values of the extracted tones may be inverted. At 912, it may be determined whether the inverted values of the extracted tones are matched to the values of the same tones of the L-SIG symbol. If it is determined that the inverted values of the extracted tones are matched to the values of the same tones of the L-SIG symbol, processing may continue at 914. If it is determined that the inverted values of the extracted tones are not matched to the values of the same tones of the L-SIG symbol, processing may continue at 926. At 914, the L-SIG symbol may be demodulated and decoded. At 916, it may be determined whether the parity check is passed. If it is determined that the parity check is passed, processing may continue at 918. If it is determined that the parity check is not passed, processing may continue at 926. At 918, it may be determined whether the RATE field of the L-SIG is set to "1101" for the rate of 6 Mbps. If it is determined that the RATE field of the L-SIG is set to "1101", processing may continue at 920. If it is determined that the RATE field of the L-SIG is not set to "1101", processing may continue at 926. At 920, it may be determined whether the LENGTH field value of the L-SIG is divisible by 3. If it is determined that the LENGTH field value of the L-SIG is not divisible by 3, processing may continue at 922. If it is determined that the LENGTH field value of the L-SIG is divisible by 3, processing may continue at 926. At 922, the tones of the FIF symbol corresponding to the Fine Identification subfield may be demodulated and decoded. At 924, it may be determined whether the CRC check is passed. If it is determined that the CRC check is passed, processing may continue at 928. If it is determined that the CRC check is not passed, processing may continue at 926. At 928, the format of the received PPDU may be identified based on the value of the Format field. At 926, it may be proceeded to the pre-EHT PPDU format identification. Processing may end at 930.

Figure 10:
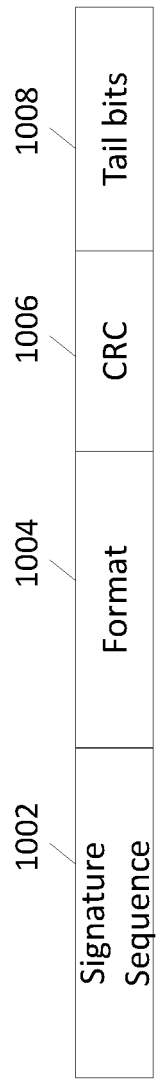
FIG. 10 shows an illustration of some existing 802.11 pre-EHT PPDU formats.

FIG. 10 shows a format of the FIF 1000 according to a second embodiment. The FIF 1000 may include a Signature Sequence subfield 1002, a Format subfield 1004, a CRC subfield 1006, and tail bits 1008. The Signature Sequence subfield 1002 may include N bits, where 8≤N≤16. The Format subfield 1004 may include L bits, and may indicate the format of a post-HE PPDU where 1≤L≤5. For example, a value 0 of the Format subfield may be used to indicate an EHT PPDU, and values from 1 to $2^L-1$ may be reserved for future use. For another example, 0 for EHT MU PPDU, 1 for EHT SU PPDU or EHT TB PPDU, and 2 to $2^L-1$ may be reserved for future use. The CRC subfield 1006 may include 18-N-L bits, and may be calculated over the Signature Sequence bits and the Format bits. The Tail bits 1008 may include 6 bits, and may be set to all-zero. The Signature Sequence subfield 1002 and CRC subfield 1006 may be used for coarse PPDU format identification while the Format subfield 1004 may be used for fine PPDU format identification. For example, for N=8, L=6, the Signature Sequence subfield 1002 may include 8 bits, the Format subfield 1004 may include 6 bits, the CRC subfield 1006 may include 4 bits, and the tail bits 1008 may include 6 bits.

Figure 11:
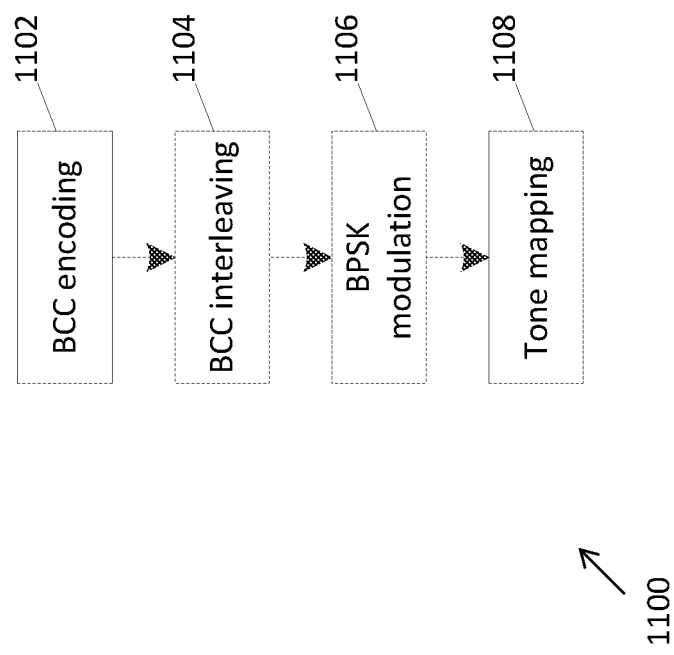
FIG. 11 shows a flow diagram illustrating the generation of the FIF symbol according to the second embodiment.

FIG. 11 shows a flow diagram 1100 illustrating the generation of the FIF symbol according to the second embodiment. The FIF symbol may be generated in the same manner as the RL-SIG symbol of a HE PPDU. At 1102, the 24-bit FIF may be encoded with rate ½ BCC and 48 encoded bits may be generated. At 1104, the 48 encoded bits may be interleaved. At 1106, the 48 interleaved bits may be modulated with BPSK. At 1108, the 48 BPSK symbols may be mapped to the 48 data tones. Accordingly, the FIF symbol can be demodulated and decoded in the same manner as the RL-SIG symbol, resulting in very low probability of false detection of a HE PPDU to a post-HE PPDU.

It may be desirable that the signature sequence bits have at least one bit different from the corresponding information bits of the RL-SIG (which may be provided after the L-SIG in a HE PPDU, and as such may be at the same position as the FIF according to various embodiments) so that the probability of false detection of a HE PPDU to a post-HE PPDU can be reduced.

According to various embodiments, a signature sequence may include a pattern of a subset of consecutive bits in the signature sequence which different from that of the corresponding bits in the RL-SIG.

As a first example, it is to be noted the third bit (B3) of the RL-SIG is fixed to "1" regardless of the rate. As such, an 8-bit signature sequence may be "XXX0XXXX" (X may be either 0 or 1), and such a signature sequence may be different from the RL-SIG (at least due to the different third bit).

As a second example, it is to be noted that the zero-th to third bits [B0:B3] are "1101" in the RL-SIG for the rate of 6 Mbps. As such, an 8-bit signature sequence may be "0010XXXX" (X may be either 0 or 1) and such a signature sequence may be different from the RL-SIG for the rate of 6 Mbps (at least due to the different bits [B0:B3]). The signature sequence of the second example may be more robust than the signature sequence of the first example (for example due to the higher number of different bits).

In a third example, it is to be noted that the fourth bit (B4) is a reserved bit in the RL-SIG and is currently fixed to 0. As such, an 8-bit signature sequence may be "00101XXX" (X may be either 0 or 1), and such a signature sequence may be different from the RL-SIG (at least due to the different bits [B0:B3] and B4). The signature sequence of the third second example may be even more robust than the signature sequence of the second example (for example due to the higher number of different bits).

It may be desirable that the signature sequence bits have at least one bit different from the corresponding information bits of the VHT-SIG-A1 (which may be provided after the L-SIG in a VHT PPDU, and as such may be at the same position as the FIF according to various embodiments) so that the probability of false detection of a VHT PPDU to a post-HE PPDU can be reduced.

According to various embodiments, a signature sequence may be provided that includes a pattern of a first subset of consecutive bits which are different from that of the corresponding bits in the RL-SIG; and a pattern of a second subset of consecutive bits in the signature sequence may be different from that of the corresponding bits in the VHT-SIG-A1.

It is to be noted that [B0:B1] is "11" in the RL-SIG for the rate of 6 Mbps, and that B2 is a reserved bit in the VHT-SIG-A1, which is currently fixed to "1". Furthermore, it is to be noted that [B3:B7] is "X0000" or "X1111" for SU and "0XXXX" for MU (X may be either 0 or 1) in the VHT-SIG-A1. As such, an exemplary 8-bit signature sequence can be "00010111".

According to various embodiments, it may be desired that the signature sequence bits have at least one bit different from the corresponding information bits of the SERVICE field of a non-HT PPDU so that the probability of false detection of a non-HT PPDU to a post-HE PPDU can be reduced.

According to various embodiments, a signature sequence may be provided which include a pattern of a first subset of consecutive bits in the signature sequence which are different from that of the corresponding bits in the RL-SIG; and a pattern of a second subset of consecutive bits in the signature sequence are different from that of the corresponding bits in the VHT-SIG-A1; and a pattern of a third subset of consecutive bits in the signature sequence are different from that of the corresponding bits in the SERVICE field. Accordingly, a post-HE PPDU format identification may be possible without LENGTH field value check, so that the L-SIG with the LENGTH field value divisible by 3 may be used for other purposes in a post-HE PPDU.

It is to be noted that [B0:B1] is "11" in the RL-SIG for the rate of 6 Mbps. Furthermore, it is to be noted that B2 is a reserved bit in the VHT-SIG-A1 and is currently fixed to 1. Also, it is to be noted that [B3:B6] is "X000" or "X111" for SU and [0XXX] for MU (X may be either 0 or 1) in the VHT-SIG-A1. Furthermore, it is to be noted that B7 is a first reserved bit in the SERVICE field and currently fixed to "0", which becomes "1" after it is scrambled with the scrambler's initial state set to "0001011" (like described with reference to FIG. 12 below). As such, an exemplary 8-bit signature sequence can be "00010110".

Figure 12:
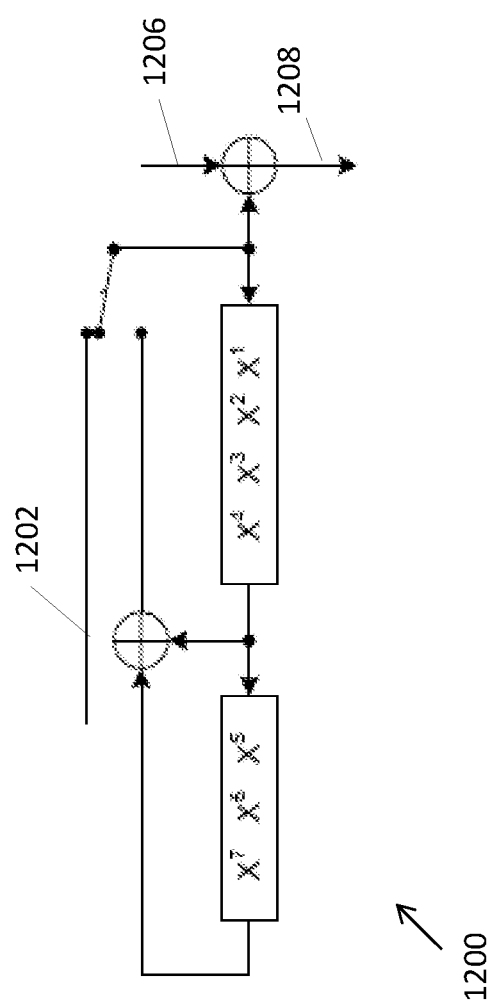
FIG. 12 shows a scrambler.

FIG. 12 shows a scrambler 1200. The first 7 bits [B0:B6] 1202 of the SERVICE field is "0001011", which also serves as the scrambler's initial state. Since the first reserved SERVICE bit (B7) of the SERVICE field is zero at data input 1206, the scrambled data output 1208 provides a value of "1". Thus, the first 8 bits of the SERVICE field in a non-HT PPDU is "00010111" after scrambling.

According to another example, it is to be noted that [B0:B1] is "11" in the RL-SIG for the rate of 6 Mbps, that B2 is a reserved bit in the VHT-SIG-A1 and is currently fixed to 1, that [B3:B6] is "X000" or "X111" for SU and [0XXX] for MU (X may be either 0 or 1) in the VHT-SIG-A1, that [B7:B11] are reserved SERVICE bits in the SERVICE field and currently fixed to "00000", which become "10101" after it is scrambled with the scrambler's initial state set to "0001011". As such, an exemplary 12-bit signature sequence can be "000101101010".

Figure 13:
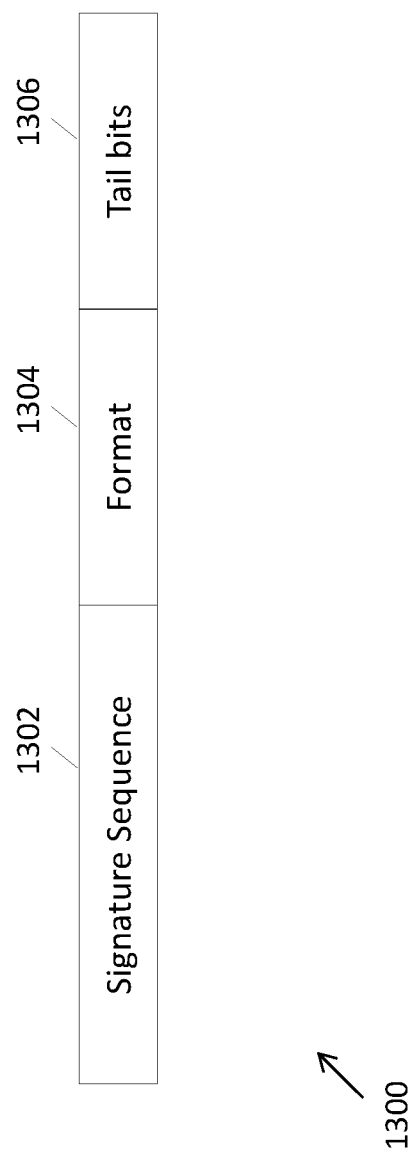
FIG. 13 shows another format of the FIF according to the second embodiment.

FIG. 13 shows another example format of the FIF 1300 according to the second embodiment. The FIF 1300 may include a Signature Sequence subfield 1302, a Format subfield 1304, and tail bits 1308. For example, with N=12 and L=6, the Signature Sequence subfield 1302 may include 12 bits, the Format subfield 1304 may include 6 bits, and the tail bits 1308 may include 6 bits. Compared to the FIF 1000 shown in FIG. 10, the FIF 1300 does not include the CRC subfield. This is because the 12-bit signature sequence may provide enough error detection capability.

Figure 14:
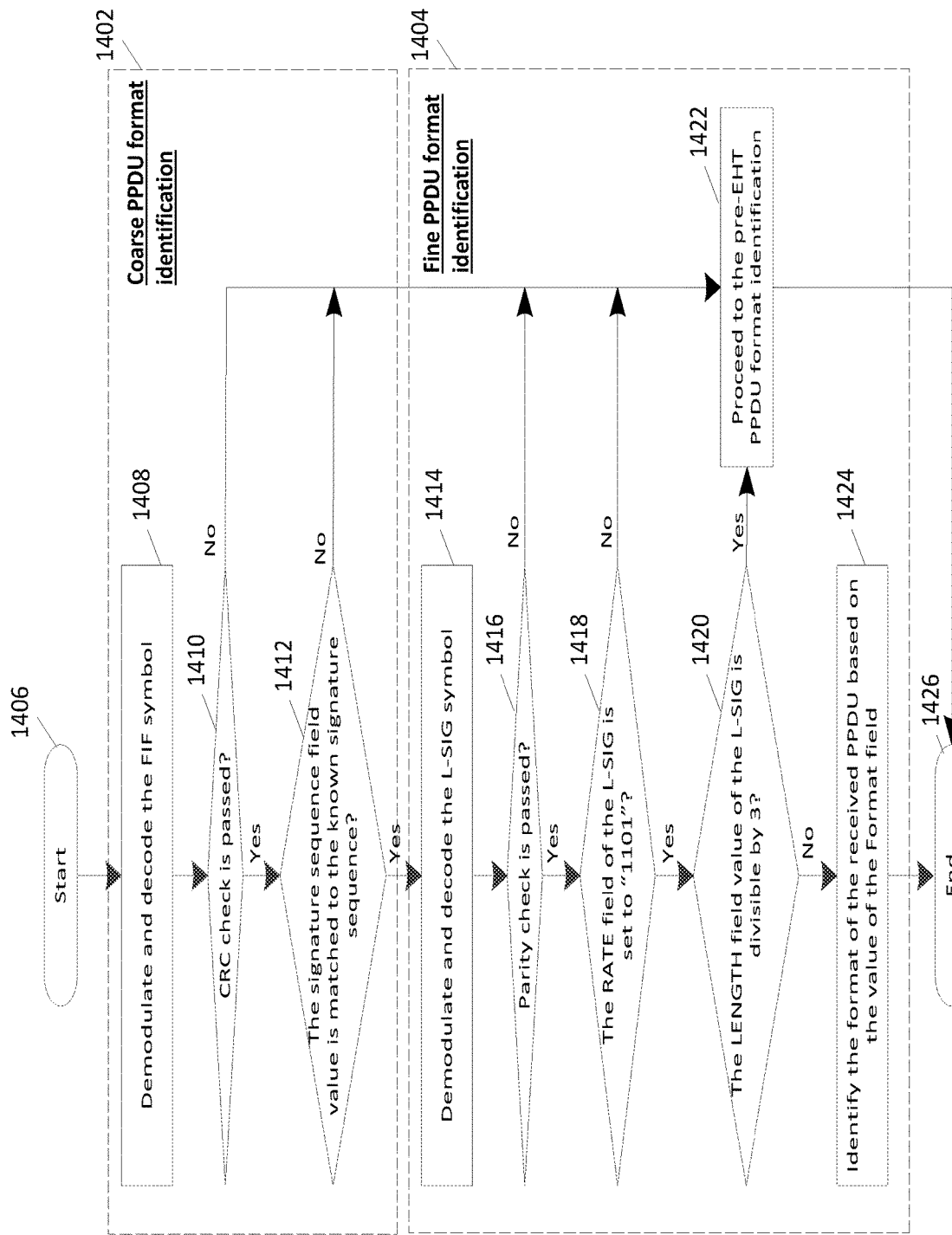
FIG. 14 shows a flow diagram illustrating processing at a STA or at an AP according to the second embodiment.

In the following, processes of how the FIF 1300 is used for PPDU format identification, in particular, for determining whether a PHY version of the PPDU is not older than a defined PHY version are demonstrated. FIG. 14 shows a flow diagram 1400 illustrating processing at a STA or at an AP according to the second embodiment. Coarse PPDU format identification may be provided, like indicated by dashed box 1402. Fine PPDU format identification may be provided, like indicated by dashed box 1404. Processing may start at 1406. At 1408, the FIF symbol may be demodulated and decoded. At 1410, it may be determined whether the CRC check is passed. If it is determined that the CRC check is passed, processing may continue at 1412. If it is determined that the CRC check is not passed, processing may continue at 1422. At 1412, it may be determined whether the Signature Sequence field value is matched to the known signature sequence. If it is determined that the Signature Sequence field value is matched to the known signature sequence, processing may continue at 1414. If it is determined that the Signature Sequence field value is not matched to the known signature sequence, processing may continue at 1422. At 1414, the L-SIG symbol may be demodulated and decoded. At 1416, it may be determined whether the parity check is passed. If it is determined that the parity check is passed, processing may continue at 1418. If it is determined that the parity check is not passed, processing may continue at 1422. At 1418, it may be determined whether the RATE field of the L-SIG is set to "1101". If it is determined that the RATE field of the L-SIG is set to "1101", processing may continue at 1420. If it is determined that the RATE field of the L-SIG is not set to "1101", processing may continue at 1422. At 1420, it may be determined whether the LENGTH field value of the L-SIG is divisible by 3. If it is determined that the LENGTH field value of the L-SIG is not divisible by 3, processing may continue at 1424. If it is determined that the LENGTH field value of the L-SIG is divisible by 3, processing may continue at 1422. At 1424, the format of the received PPDU may be identified based on the value of the Format field. At 1422, it may be proceeded to the pre-EHT PPDU format identification. Processing may end at 1426.

Figure 15:
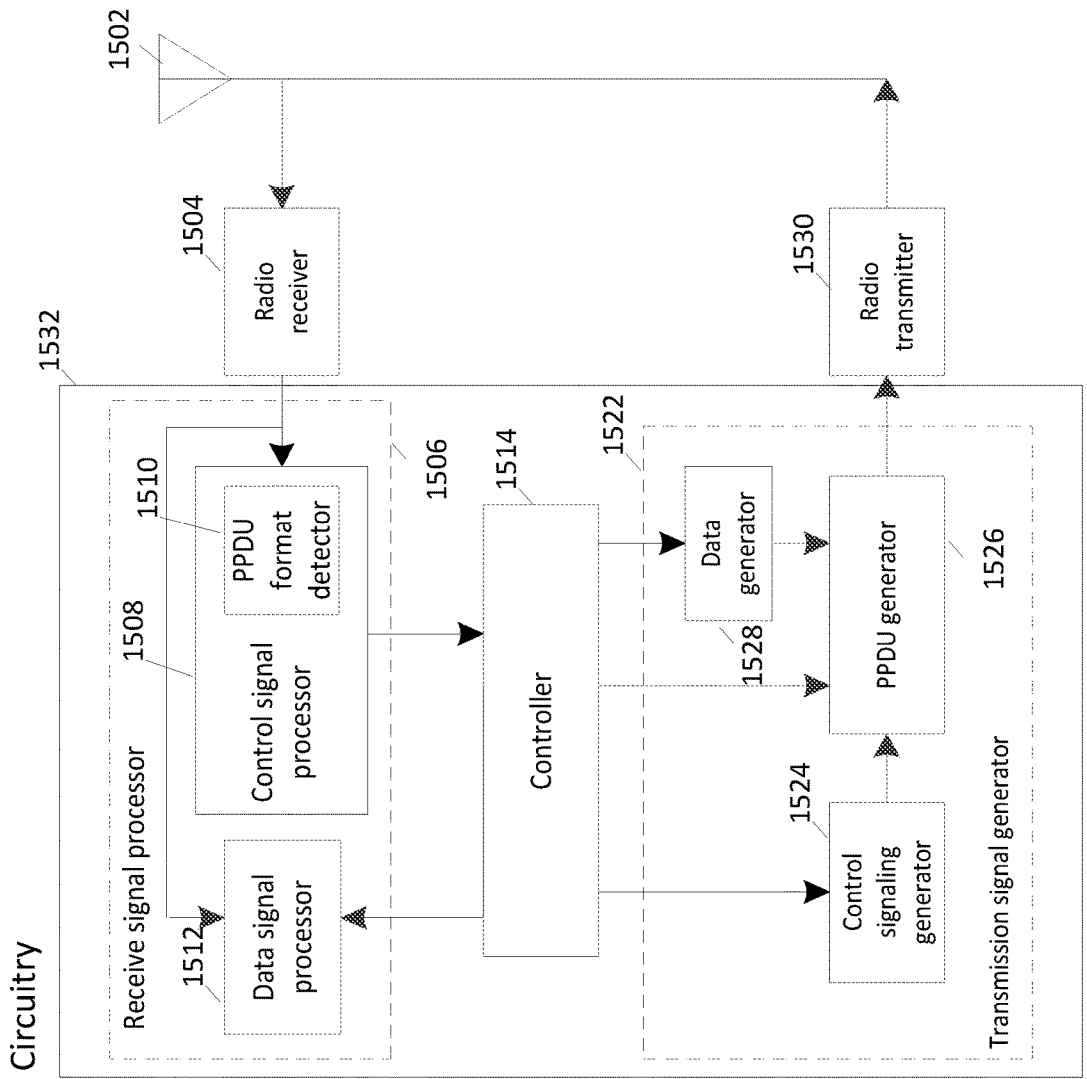
FIG. 15 shows a configuration of a communication device, for example an AP or a STA, according to various embodiments.

FIG. 15 shows a configuration of a communication device 1500, for example an Access Point (AP) or a terminal (STA; station) according to various embodiments. Similar to the schematic example of the communication apparatus as shown in FIG. 3A, the communication apparatus 1500 in the schematic example of FIG. 15 includes at least one radio transmitter 1530, at least one radio receiver 1504, multiple antennas 1502 (for the sake of simplicity, only one antenna is depicted in FIG. 18) and circuitry 1532. The circuitry 1532 may include at least one controller 1514 for use in software and hardware aided execution of tasks that the controller 1514 is designed to perform, including control of communication using post-HE PPDUs. The circuitry 1532 may further include a receive signal processor 1506 and a transmission signal generator 1522. The controller 1514 may control the receive signal processor 1506 and the transmission signal generator 1522.

The receive signal processor 1506 may include a control signal processor 1508 and a data signal processor 1512. The control signal processor 1508 may process control signaling portions of the received signals (e.g. FIF, SIG-A), and may include a PPDU format detector 1510. The PPDU format detector 1510 may determine the format of a received PPDU. The data signal processor 1512 may process data portions of the received signals.

The transmission signal generator 1522 may include a control signal generator 1524, a PPDU generator 1526, and a data generator 1528. The control signal generator 1524 may generate control signaling portions (e.g. FIF, SIG-A). The PPDU generator 1526 may generate PPDUs (e.g. post-HE PPDU). The data generator 1528 may generate data portions of the transmission signals.

As described above, the embodiments of the present disclosure provide an advanced communication system, communication methods and communication apparatuses that enable identification of the format of a post-HE (post High Efficiency) PPDU in an efficient manner.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be understood that while some properties of the various embodiments have been described with reference to a device, corresponding properties also apply to the methods of various embodiments, and vice versa.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

The invention claimed is:

1. A communication apparatus comprising:
    circuitry adapted to generate a Physical Layer Protocol Data Unit, PPDU, that contains a first signal field, a second signal field, a third signal field including a version independent part and a version dependent part, and an Extremely High Throughput signal (EHT-SIG) field or a future signal field defined in future PPDUs newer than an EHT-PPDU; and
    a transmitter adapted to transmit the generated PPDU,
    wherein the second signal field indicates whether a physical layer (PHY) version of the generated PPDU is not older than a defined PHY version,
    wherein the version independent-fields, which are part is consistent in-a statie location across the EHT-PPDU and the future PPDUs,
    wherein the version independent part includes a PHY version identifier, an uplink/downlink flag, a basic service set (BSS) color, and a transmission opportunity (TXOP) duration,
    wherein the PHY version identifier contains a defined number of version independent bits that indicates the PHY version of the generated PPDU, and
    wherein the third signal field is Binary Phase Shift Keying (BPSK) modulated and is consistent across the EHT PPDU and the future PPDUs.

2. The communication apparatus according to claim 1, wherein the version dependent part has a variable number of bits.

3. The communication apparatus according to claim 1, wherein the second signal field is a repeat of the first signal field.

4. The communication apparatus according to claim 3, wherein the second signal field is mapped to tones, and respective values of the second signal field at a part of the tones are generated according to corresponding values of the first signal field at the part of the tones.

5. The communication apparatus according to claim 4, wherein respective values of the second signal field at a part of the tones are inverted from corresponding values of the first signal field at the part of the tones.

6. The communication apparatus according to claim 4, wherein the tones are data subcarriers.

7. The communication apparatus according to claim 1, wherein a PPDU for the defined PHY version is the EHT-PPDU.

8. The communication apparatus according to claim 1, wherein the second signal field and the third signal field are encoded in a single Orthogonal Frequency Division Multiplexing (OFDM) symbol.

9. The communication apparatus according to claim 1, wherein the first signal field and the second signal field indicate whether the PHY version of the generated PPDU is not older than the defined PHY version.

10. A communication method comprising:
    generating a Physical Layer Protocol Data Unit, PPDU, that contains a first signal field, a second signal field, a third signal field including a version independent part and a version dependent part, and an Extremely High Throughput signal (EHT-SIG) field or a future signal field defined in future PPDUs newer than an EHT-PPDU; and
    transmitting the generated PPDU,
    wherein the second signal field indicates whether a physical layer (PHY) version of the generated PPDU is not older than a defined PHY version,
    wherein the version independent part is consistent in a statie location across the EHT-PPDU and the future PPDUs,
    wherein the version independent part includes a PHY version identifier, an uplink/downlink flag, a basic service set (BSS) color, and a transmission opportunity (TXOP) duration,
    wherein the PHY version identifier contains a defined number of version independent bits that indicates the PHY version of the generated PPDU, and
    wherein the third signal field is Binary Phase Shift Keying (BPSK) modulated and is consistent across the EHT PPDU and the future PPDUs.

11. The communication method according to claim 10, wherein the version dependent have part has a variable number of bits.

12. The communication method according to claim 10, wherein the second signal field and the third signal field are encoded in a single Orthogonal Frequency Division Multiplexing (OFDM) symbol.

* * * * *